United States Patent
Ulrich et al.

(10) Patent No.: US 6,781,085 B2
(45) Date of Patent: Aug. 24, 2004

(54) METHOD AND APPARATUS OF COORDINATING OPERATING MODES OF A PLASMA CUTTER AND A POWER SUPPLY

(75) Inventors: James F. Ulrich, Hortonville, WI (US); Joseph Schneider, Menayha, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/267,441

(22) Filed: Oct. 9, 2002

(65) Prior Publication Data

US 2004/0069752 A1 Apr. 15, 2004

(51) Int. Cl.[7] ............................................. B23K 10/00
(52) U.S. Cl. ........................... 219/121.39; 219/121.54; 219/121.57
(58) Field of Search ..................... 219/121.39, 121.41, 219/121.45, 121.46, 121.48, 121.54, 490, 507, 509, 121.57; 700/117, 108; 83/170, 15, 16

(56) References Cited

U.S. PATENT DOCUMENTS 5,416,297 A * 5/1995 Luo et al. ............... 219/121.57
6,622,058 B1 * 9/2003 Picard et al. ............... 700/117

FOREIGN PATENT DOCUMENTS

JP          10244372 A  *  9/1998  ........... B23K/10/00

* cited by examiner

*Primary Examiner*—Quang T Van
(74) *Attorney, Agent, or Firm*—Ziolkowski Patent Solutions Group, LLC

(57) ABSTRACT

The present invention is directed to a method and apparatus for coordinating the idle mode of a plasma cutter with the idle mode of a power supply so as to prevent lock-out of the plasma cutter when the power supply is in an idle operating state. By putting the plasma cutter in a non-lock-out or "sleep" mode, fuel consumption as well as noise generated by the power supply are reduced. Additionally, by placing the plasma cutter in sleep mode, the user need not turn the power switch of the plasma cutter on and off in order to save power. User input to the plasma cutter kicks the power supply out of idle. The power supply will remain at a non-idle, full operating run mode during the cutting process. However, once the cut is complete and the current draw of the plasma cutter is at a level lower than the power supply idle mode, the plasma cutter will return to sleep mode.

18 Claims, 3 Drawing Sheets

METHOD AND APPARATUS OF COORDINATING OPERATING MODES OF A PLASMA CUTTER AND A POWER SUPPLY

BACKGROUND OF THE INVENTION

The present invention relates generally to plasma cutting systems and, more particularly, to a method and apparatus for coordinating the operating modes of a plasma cutter and a portable power supply so that the plasma cutter is prevented from being locked-out when no load is pulled from the power supply.

Many portable power supplies such as generators enter a power saving idle mode when not in use for extended periods of time or when no load is placed thereon. The line voltage and frequency of the power source drop to a level substantially below its rated operation to save fuel, reduce wear, as well as reduce noise, but normally do so only after some period of delay. The power supply then returns to normal operation when a load is placed on its output. Generally, plasma cutters draw significantly less current when idling than when cutting. Further, a plasma cutter in idle mode can operate on a power supply in idle mode, but a plasma cutter in cutting mode cannot operate on a power supply in idle mode.

When a plasma cutter operates on a power supply in idle mode, several undesirable scenarios may occur. For example, the plasma cutter may draw sufficient current to maintain the power supply in normal mode at all times. As a result, the plasma cutter is available at all times but wastes energy and results in unnecessary noise generation by the power supply. Therefore, the efficiency of the plasma cutter and power supply are affected as a result of unnecessary fuel consumption and noise emissions.

In another undesirable scenario, the plasma cutter may not draw enough current to place the power supply back into normal operating mode. As a result, the plasma cutter cannot function properly. If an under-voltage threshold of the plasma cutter prevents the trigger of the plasma cutter from activating, the plasma cutter cannot then draw enough current to kick the power supply out of idle mode. Essentially, the under-voltage threshold detection locks out the plasma cutter when an idle mode of the power supply is detected.

Operation of a plasma cutter on a power supply in idle mode can also result in damage to the plasma cutter as a result of the low frequency of the power supply. In a further wasteful scenario, the operator of the welding system may lock-out the plasma cutter so that the plasma cutter never reaches an idle mode. As a result, the power supply unnecessarily wastes energy and creates noise.

It would therefore be desirable to design a plasma cutting system such that the idle mode of the plasma cutter is coordinated with the idle mode of the power supply such that the plasma cutting system is prevented from being locked-out even when no load is placed on the power supply.

BRIEF DESCRIPTION OF THE INVENTION

The present invention is directed to a method and apparatus of coordinating the idle mode of a plasma cutter with the idle mode of a power supply overcoming the aforementioned drawbacks. When the power supply is not loaded, the plasma cutter is placed in a sleep mode so as to improve the efficiency of the power supply and plasma cutter as well as reduce unnecessary noise. User input to the plasma cutter such as pressing of a torch trigger switch simulates a load being placed on the power supply and kicks the power supply out of idle. While the plasma cutter cuts, the power supply continues to run in an out-of-idle mode. A control then continuously monitors a trigger mode of the plasma cutter to determine if the plasma cutter is directed toward an idle mode. If so, the control immediately drives the power supply to an idle mode and returns the plasma cutter to a sleep or non-lock-out mode.

In operation, the user of the plasma cutting system plugs the plasma cutter into a power supply and puts the power supply in idle mode followed by turning on the plasma cutter. With most portable power supplies, idle is automatically achieved at initial start-up. The power supply then stays in an idle mode or temporarily goes to a run mode due to an inrush of current from the plasma cutter. The plasma cutter likewise remains in idle mode and waits for a user input, such as activation of a trigger. The plasma cutter may limit its output current during idle and, alternatively, deactivate its boost converter to save power and draw less current. When the user activates the torch activation switch or other activation means, the plasma cutter increases the current draw sufficiently to kick the power supply out of idle mode. After the cut, the plasma cutter current draw drops to a level lower than the power supply idle mode. Once the cut is completed, the plasma cutter may then deactivate the boost converter front end to save power as well as turn off its cooling fan to save power and reactivate an idle mode condition.

Therefore, in accordance with one aspect of the present invention, a controller for a plasma cutting device responsive to a set of instructions that when executed causes the controller to determine an operating state of a power supply is provided. The set of instructions further causes the controller to prevent lock-out of the plasma cutting device even if the power supply is in an idle operating state.

In accordance with another aspect of the present invention, a plasma cutting apparatus includes a plasma cutter and a portable power supply. The plasma cutting apparatus further includes an operating condition coordinator configured to put the plasma cutter in a sleep mode when the portable power supply is not loaded.

In accordance with yet another aspect of the present invention, the plasma cutter apparatus comprises a cable connected to a portable power supply at one end. The apparatus further includes a power source that is configured to condition raw power received from the power supply via the cable. The plasma cutter apparatus further includes a cutting device connected to the power source and means for preventing lock-out of the cutting device if no load is placed on the portable power supply.

Various other features, objects and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

Figure 1:
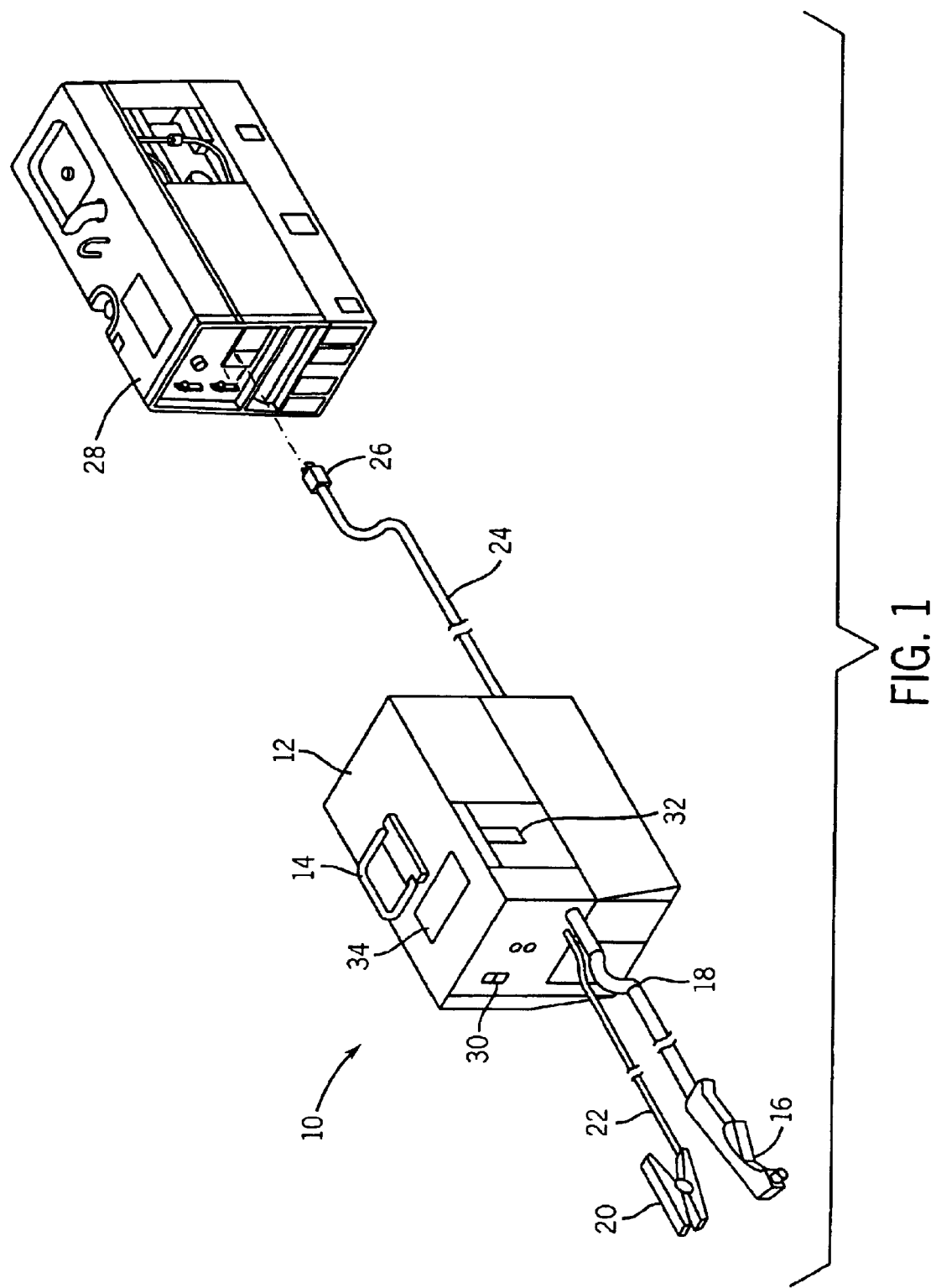
FIG. 1 is a perspective view of a plasma cutter and portable power supply incorporating the present invention.

Referring to FIG. 1, an air plasma cutting system 10 includes a power source 12 and/or system interface configured to condition raw power from a power supply such as an engine driven generator 28 and regulate the cutting process. Power source 12 includes a handle 14 which effectuates transportation of the power source from one site to another. Connected to power source 12 is torch 16 via cord 18. Also connected to power source 12 is a work clamp 20 which is designed to hold the workpiece to be cut. Connecting work clamp 20 to the power source 12 is cable 22 which is designed to provide a return path for the cutting current from the torch through the workpiece and the clamp. Extending from a rear portion of power source 12 is power cable 24 having plug 26 for connecting the power source 12 to portable power supply 28. Power source 12 further includes an ON/OFF switch 30, latch 32, and a model label 34.

To effectuate cutting of a workpiece, torch 16 is placed in close proximity to a workpiece (not shown) connected to clamp 20. A user may then raise a trigger lock (not shown) of torch 16 and press a trigger switch (not shown) so that a pilot arc begins. Shortly thereafter, a cutting arc is generated at which the user may then slowly begin moving the torch across the workpiece. The user may then adjust the torch speed so that sparks go through the workpiece and out the bottom of the cut. Near completion of the cut, it is generally advisable to pause briefly to allow the arc to catch up with the torch and fully penetrate the cutting piece. It is customary for post-flow to continue for a short period of time after release of the trigger. During this post-flow, a cutting arc may be instantly restarted by raising the trigger lock and repressing the trigger switch.

Figure 2:
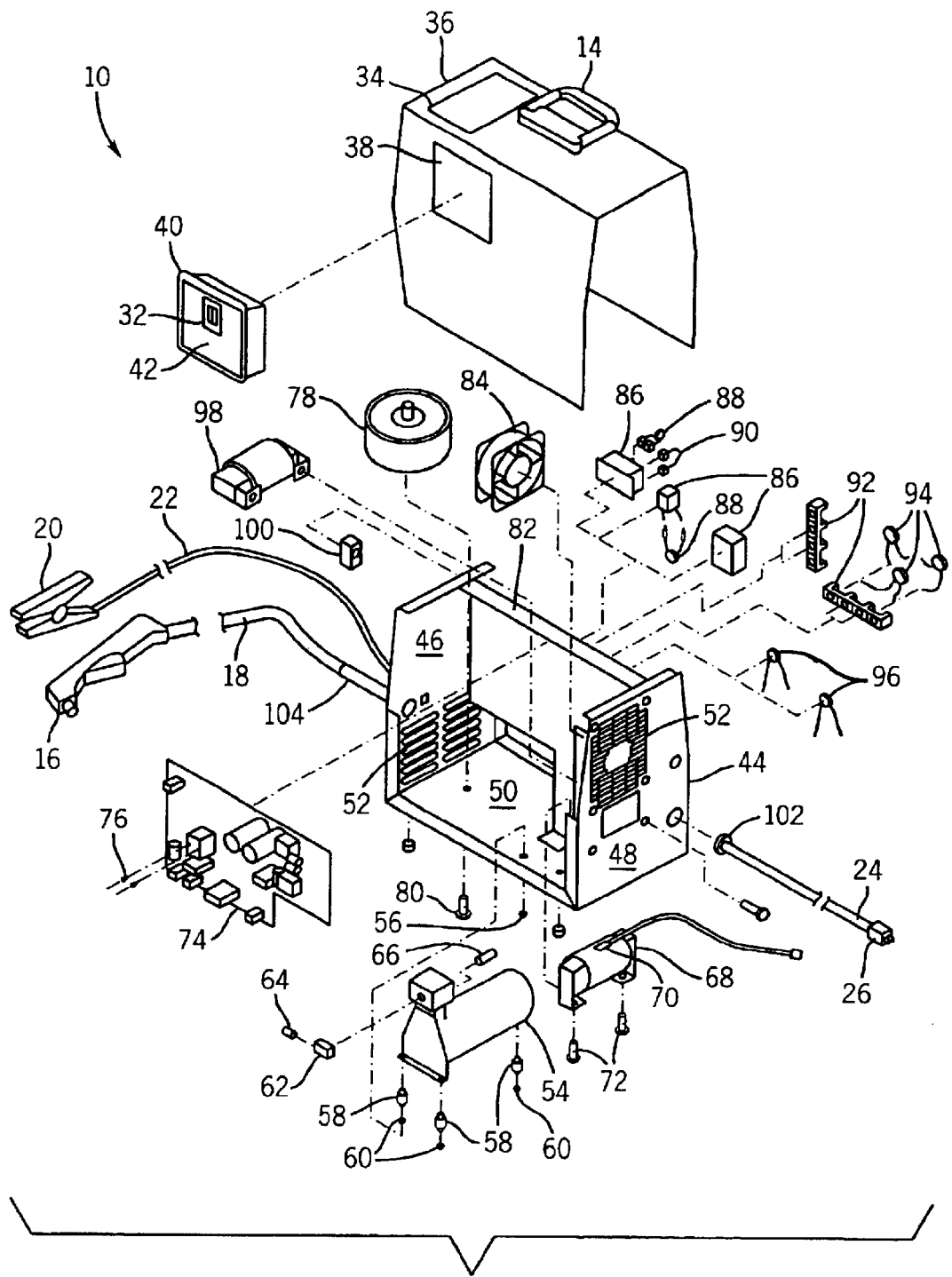
FIG. 2 is an exploded view of that shown in FIG. 1.

Referring now to FIG. 2, an exploded view of the power source 12 is shown. Power source 12 includes an outer frame or housing cover 36 designed to protect the internal components of the power source. Attached to cover 36 is carrying handle 14. Preferably, label 34 is affixed to a top portion of cover 36. Cover 36 further includes orifice 38 designed to receive storage box 40 which includes a door 42 for the secure storage of consumables. Storage box 40 further includes latch 32 for locking door 42.

Cover 36 is secured to case section 44 which includes front panel 46, rear panel 48, and floor panel 50. To assist with cooling of the internal components of the power source, front and rear panels 48 include vents 52. Housed within the portable power source is compressor 54. Compressor 54 is mounted to floor panel 50 by nuts 56. Nuts 56 are threaded onto a rubber mount 58 that together with washer 60 securely mount compressor 54 to the floor panel 50 of the power source. Fastened to compressor 54 is elbow 62 and fitting 64 which together securely fasten filter 66 to the compressor. Also housed within the portable power source 12 is inductor 68 which includes thermostat 70. Inductor 68 is likewise mounted to floor panel 50 of the power source using bolts 72.

The power source which is designed to condition raw power received from a power supply such as an engine-driven generator for use during cutting also includes a circuit board assembly 74 that controls the internal components. Attached to circuit board 74 is thermostat 76. A toroid main transformer 78 is also housed within the power source and securely fastened to floor panel 50 using bolt 80. A baffle plate 82 is also provided and generally bisects the internal volume of the power source. The baffle plate 82 operates to separate the various internal components housed within the power source as well as provide structural support for case section 44.

The power source further includes a fan 84 that operates to cool the internal components. The power source also includes relays 86, thermoster 88, diode assembly 90, connection studs 92, and varistors 94. A pair of capacitors 96 is also used. The portable power source further includes a second inductor 98 as well as rocker switch 100. As further shown, a strained relief 102 is connected to back panel 48 for securing power cord 24 to the power source. Extending from front panel 46 is clamp 20 via lead wire 22. Further extending from front panel 46 is torch 16 via cable 18. Securing the connection of cable 18 to the power source is strain relief 104.

Figure 3:
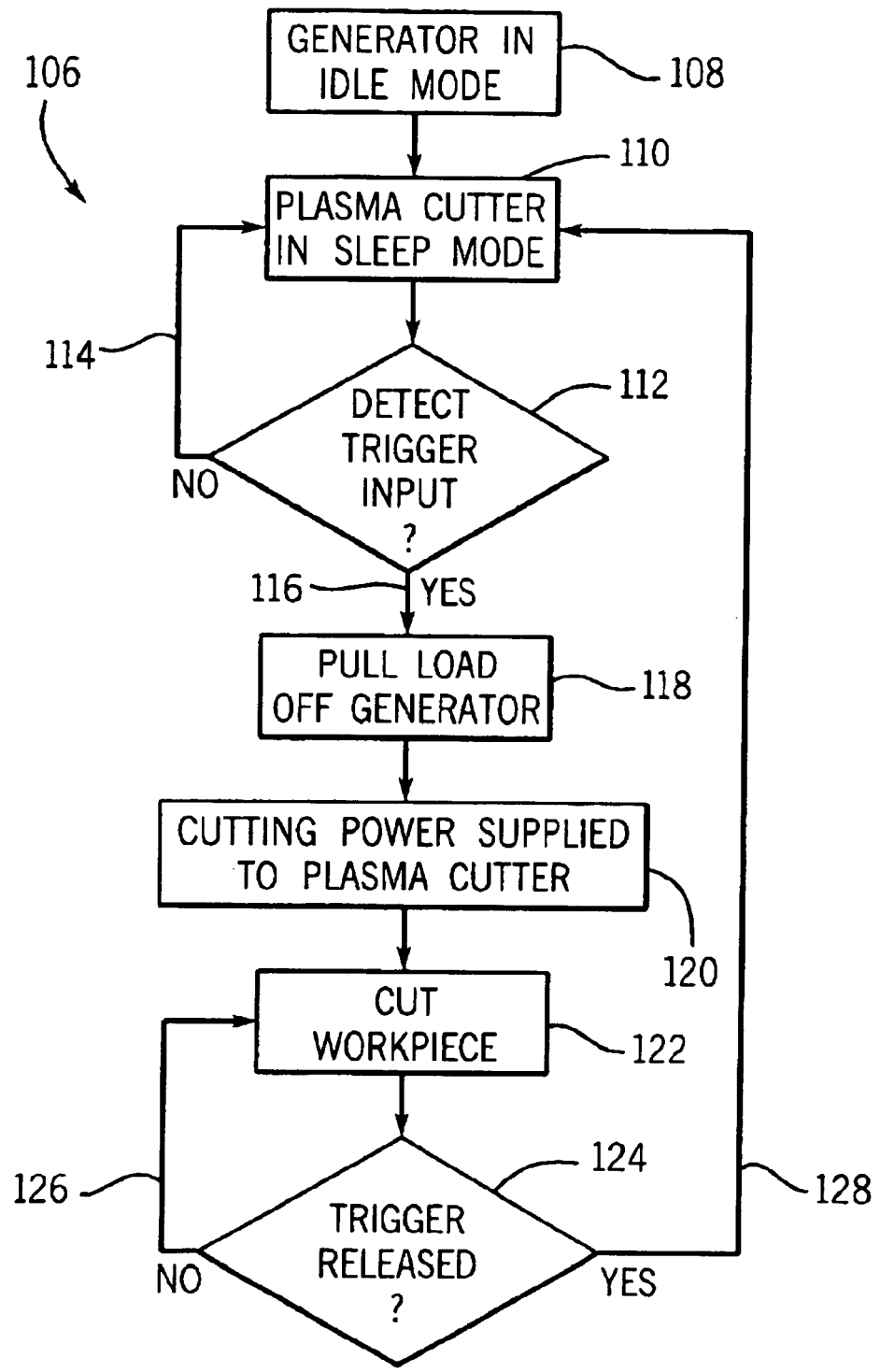
FIG. 3 is a flow chart setting forth steps of a process for coordinating the operating mode of a power supply and plasma cutter in accordance with the present invention and that can be used in a software implementation of the invention.

Referring now to FIG. 3, the steps of a process for coordinating the idle mode of a portable power supply and a plasma cutter will be described in greater detail. The process 106 may be incorporated into the plasma cutter with software, in which case, the steps are equivalently the acts of the program, or may be equivalently be incorporated in hardware. The process begins at 108 with the user connecting the plasma cutter to the portable power supply and the subsequent placing of the power supply in idle mode. Generally, the power supply stays in idle mode but may temporarily go to a run mode due to the inrush of current of the plasma cutter during start-up. At 110, the plasma cutter is placed in a sleep mode and will remain in sleep mode until a trigger input 112. Sleep mode is defined as a non-lock-out mode. That is, rather than being locked-out from continual operation because the generator is in idle mode, the plasma cutter is placed in a "sleep" or waiting-input mode such that operation of the plasma cutter may begin immediately upon a trigger input. The plasma cutter will remain in sleep mode 114, 116 until a trigger input is received or turned off. To save power and draw less current, the plasma cutter may turn off its boost converter when in sleep mode. When the user presses the torch trigger switch or other activation means 112, 116, the plasma cutter increases its current draw sufficiently to kick the power supply out of idle mode 118, thereby causing sufficient power to be provided to the plasma cutter at 120 to effectuate cutting of a workpiece at 122. That is, depressing of the trigger causes a load to be pulled off the power supply. As a result, the line frequency of the power supplied to the plasma cutter by the power supply increases.

Process 106 continues at 124 by determining if the trigger is released (i.e., the cut is complete). If the torch activation means remains activated 124, 126, cutting of the workpiece continues. If the trigger is released 124, 128, the current draw of the plasma cutter drops (pending any postflow or fan-on-demand cooling period) to a level lower than the power supply idle mode. As a result of the current draw of the plasma cutter drops to a level lower than the power supply idle mode, the plasma cutter is immediately kicked back into sleep mode. As a result, both the plasma cutter and the portable power supply are in a power saving idle mode without the user having to turn the power switch of the plasma cutter on and off in order to save power. Once the plasma cutter returns to sleep mode, its boost converter front end may be turned off to save power as well as its fan. Alternatively, rather than driving the power supply to a sleep mode upon the deactivation of the torch and subsequent "sleeping" of the plasma cutter, the plasma cutter could be driven to sleep upon the switching of the plasma cutter fan or boost converter off.

Rather than confirming that the portable power supply has been kicked out of sleep mode based on the line frequency of the power signal being supplied to the power source, confirmation may also be based on the line voltage, an external signal separate from the line frequency or line voltage of the power supply, frequency shift keying (FSK), or other communication done over the power cord, or any combination of these. A frequency domain method such as FFT could indicate idle mode. It should also be noted that the present invention is applicable with a power supply that may or may not have a separate weld winding as well as a plasma cutter not having a boost converter. Additionally, the present invention is applicable with a plasma cutter having a power factor correction means.

Therefore, in accordance with one embodiment of the present invention, a controller for a plasma cutting device responsive to a set of instructions that when executed causes the controller to determine an operating state of a power supply is provided. The set of instructions further causes the controller to prevent lock-out of the plasma cutting device even if the power supply is in an idle operating state. In accordance with another embodiment of the present invention, a plasma cutting apparatus includes a plasma cutter and a portable power supply. The plasma cutting apparatus further includes an operating condition coordinator configured to put the plasma cutter in a sleep mode when the portable power supply is not loaded.

In accordance with yet another embodiment of the present invention, the plasma cutter apparatus comprises a cable connected to a portable power supply at one end. The apparatus further includes a power source configured to condition raw power received from the power supply via the cable. The plasma cutter apparatus further includes a cutting device connected to the power source and means for preventing lock-out of the cutting device if no load is placed on the portable power supply.

The present invention has been described in terms of the preferred embodiment, and it is recognized that equivalents, alternatives, and modifications, aside from those expressly stated, are possible and within the scope of the appending claims.

What is claimed is:

1. A controller for a plasma cutting device responsive to a set of instructions that when executed causes the controller to:
   determine an operating state of a power supply; and
   prevent lock-out of the plasma cutting device oven if the power supply is in an idle operating state.

2. The controller of claim 1 wherein the set of instructions further causes the controller to prevent lock-out of the plasma cutting device even if no load is being pulled off the power supply.

3. The controller of claim 1 wherein the set of instructions further causes the controller to drive the plasma cutting device to a cutting state immediately upon detection of a trigger input.

4. The controller of claim 3 wherein the set of instructions further causes the controller to simulate a load to drive the power supply to a non-idle state upon detection of the trigger input.

5. The controller of claim 1 wherein the set of instructions further causes the controller to determine the operating state of the power supply from at least one of line frequency and line voltage.

6. The controller of claim 5 wherein the set of instructions further causes the controller to enable cutting by the plasma cutting device if the line frequency and the line voltage of the power supply exceed a predetermined level.

7. The controller of claim 6 wherein the set of instructions further causes the controller to discriminate between an idling operating state of the power supply and an abnormal low line condition.

8. A plasma cutting apparatus comprising:
   a plasma cutter;
   a portable power supply; and
   an operating condition coordinator configured to put the plasma cutter in a sleep mode when the portable power supply is unloaded.

9. The plasma cutting apparatus of claim 8 wherein the operating condition coordinator is further configured to drive the portable power supply to a non-idle state upon user activation of the plasma cutter.

10. The plasma cutting apparatus of claim 8 wherein the plasma cutter includes a boost converter and a fan assembly.

11. The plasma cutting apparatus of claim 8 wherein the operating condition coordinator is further configured to detect a line frequency of current supplied by the portable power supply to the plasma cutter and if the line frequency is abnormal then limit plasma cutter output until the line frequency is normal.

12. A plasma cutter apparatus comprising:
   a cable connected to a portable power supply at one end;
   a power source connected to the cable at an opposite end, the power source configured to condition raw power received from the portable power supply via the cable;
   a cutting device connected to the power source; and
   means for preventing lock-out of the cutting device if no load is placed on the portable power supply.

13. The plasma cutter apparatus of claim 12 further comprising means for determining if the portable power supply is operating in an idle state.

14. The plasma cutter apparatus of claim 13 further comprising means for driving the portable power supply to a full operating speed only when the plasma cutter is in a cutting mode.

15. The plasma cutter apparatus of claim 13 further comprising a boost converter and means to deactivate the boost converter when the portable power supply is in an idle state.

16. The plasma cutter apparatus of claim 13 further comprising means to limit energy consumption of the cutting device and portable power supply.

17. The plasma cutter apparatus of claim 12 further comprising means for simulating a load being placed on the portable power supply in response to a trigger input.

18. The plasma cutter apparatus of claim 17 further comprising means for placing the cutting device in a sleep mode when no load is placed on the portable power supply.

* * * * *

UNITED STATES PATENT AND TRADEMARK OFFICE
CERTIFICATE OF CORRECTION

PATENT NO.     : 6,781,085 B2
DATED          : August 24, 2004
INVENTOR(S)    : Ulrich et al.

It is certified that error appears in the above-identified patent and that said Letters Patent is hereby corrected as shown below:

Column 5,
Line 42, delete "oven" and substitute therefor -- even --.

Signed and Sealed this

Thirtieth Day of November, 2004

JON W. DUDAS
*Director of the United States Patent and Trademark Office*